US011487993B2

United States Patent
Tong et al.

(10) Patent No.: US 11,487,993 B2
(45) Date of Patent: Nov. 1, 2022

(54) APPARATUS AND METHOD THAT DETECT WHEEL ALIGNMENT CONDITION

(71) Applicant: GM GLOBAL TECHNOLOGY OPERATIONS LLC, Detroit, MI (US)

(72) Inventors: Wei Tong, Troy, MI (US); Hojjat Izadi, Toronto (CA); Fahim Javid, Pickering (CA)

(73) Assignee: GM Global Technology Operations LLC, Detroit, MI (US)

( * ) Notice: Subject to any disclaimer, the term of this patent is extended or adjusted under 35 U.S.C. 154(b) by 1087 days.

(21) Appl. No.: 15/960,948

(22) Filed: Apr. 24, 2018

(65) Prior Publication Data

US 2019/0325290 A1   Oct. 24, 2019

(51) Int. Cl.
*G06N 3/04* (2006.01)
*B62D 15/02* (2006.01)

(52) U.S. Cl.
CPC ......... *G06N 3/0427* (2013.01); *B62D 15/021* (2013.01)

(58) Field of Classification Search
CPC .......... G06N 20/00; G06N 5/04; G06N 3/08; G06N 7/005
See application file for complete search history.

(56) References Cited

U.S. PATENT DOCUMENTS

| 8,634,986 B2 | 1/2014 | Ghoneim |
| 2002/0011093 A1 | 1/2002 | Matsuno |
| 2002/0029101 A1 | 3/2002 | Larson et al. |
| 2017/0190355 A1* | 7/2017 | Ghoneim ................. G07C 5/02 |

FOREIGN PATENT DOCUMENTS

| CN | 101878122 A | 11/2010 |
| CN | 102874301 A | 1/2013 |
| CN | 103241195 A | 8/2013 |
| CN | 105984498 A | 10/2016 |

OTHER PUBLICATIONS

Deutsch et al., Using Deep Learning-Based Approach to Predict Remaining Useful Life of Rotating Components, May 12, 2017 (Year: 2017).*

(Continued)

*Primary Examiner* — Ann J Lo
*Assistant Examiner* — Charles C Kuo
(74) *Attorney, Agent, or Firm* — Quinn IP Law (57) ABSTRACT

A method and apparatus that detect wheel misalignment are provided. The method includes predicting a self-aligning torque parameter based on a regression model determined from a dataset including one or more from among a steering wheel angle parameter, a speed parameter, a torsion bar torque parameter, a lateral acceleration parameter, and a power steering torque parameter, comparing a measured self-aligning torque parameter and the predicted self-aligning torque parameter, and outputting a wheel alignment condition indicating whether the wheel alignment is proper if the self-aligning torque parameter and the predicted self-aligning torque parameter are within a predetermined value based on the comparing.

18 Claims, 5 Drawing Sheets

(56) References Cited

OTHER PUBLICATIONS

Gomez et al., Objective Metrics for Vehicle Handling and Steering and Their Correlations With Subject Assessments, 2016, International Journal of Automotive Technology, vol. 17, No. 5, pp. 777-794 (Year: 2016).*

Green, Development of Easy to Understand Vehicle Malfunction Warnings, 1995 (Year: 1995).*

Kunstliches neuronales Netz, Wikipedia reference date Apr. 18, 2018.

Aunkofer; In Artificial Intelligence, Business Analytics, Data Mining, Data Science, Deep Learning, Machine Learing, Main Category, Mathematics, Predictive Analytics; https://date-science-blog.com/blog/2017/12/20/maschinelles-lernen-klassifikation vs Regression.

* cited by examiner

APPARATUS AND METHOD THAT DETECT WHEEL ALIGNMENT CONDITION

INTRODUCTION

Apparatuses and methods consistent with exemplary embodiments relate to detecting wheel alignment condition. More particularly, apparatuses and methods consistent with exemplary embodiments relate to detecting a wheel alignment condition of a vehicle.

SUMMARY

One or more exemplary embodiments provide a method and an apparatus that detect a wheel alignment condition based on vehicle sensor information. More particularly, one or more exemplary embodiments provide a method and an apparatus that detect wheel alignment condition by applying a model to vehicle sensor information.

According to an aspect of an exemplary embodiment, a method for detecting a wheel alignment condition is provided. The method includes predicting a self-aligning torque parameter based on a regression model determined from a dataset including one or more from among a torsion bar torque parameter, a steering wheel angle parameter, a speed parameter, a lateral acceleration parameter, and a power steering torque parameter, comparing a measured self-aligning torque parameter and the predicted self-aligning torque parameter, and based on the comparing, outputting a wheel alignment condition indicating whether the wheel alignment is proper if the self-aligning torque parameter and the predicted self-aligning torque parameter are within a predetermined value.

The method may also include normalizing one or more parameters from among the steering wheel angle parameter, the speed parameter, the torsion bar torque parameter, the lateral acceleration parameter, the power steering torque parameter, the predicted self-aligning torque parameter and the measured self-aligning torque parameter.

The normalizing may include normalizing the one or more parameters according to one from among scaling, standardization, and unit length normalization.

The regression model may be a multivariate nonlinear regression model. The regression model may also be a neural network including one or more from among a plurality of input neurons in an input layer, the plurality of input neurons corresponding to one or more from among a steering wheel angle parameter, a torsion bar torque parameter, a speed parameter, a lateral acceleration parameter, and a power steering torque parameter; a plurality of neurons in hidden layers; at least one output neuron in an output layer, the one output neuron corresponding to a predicted self-aligning torque parameter; an activation function including a rectified linear unit function; and a mean squared error function to model loss.

The predetermined value may correspond to a correctly calibrated wheel alignment.

The outputting the wheel alignment condition may output a value corresponding to at least one from among a negative camber condition of wheels, a positive camber condition of wheels, a toe-in condition of wheels, a toe-out condition of wheels, a cross-toe condition of wheels and a total-toe condition of wheels.

The steering wheel angle parameter may be measured by a transducer, the speed parameter may be measured by a wheel speed tachometer, the lateral acceleration parameter may be measured by an inertial measurement unit, the self-aligning torque parameter may be calculated from a torsion bar torque parameter and the power steering torque parameter, and the power steering torque parameter may be calculated from electronic power steering current measurements.

The outputting the wheel alignment condition may be displaying the value on vehicle display, a mobile device, or on a backend computer.

The comparing the measured self-aligning torque parameter and the predicted self-aligning torque parameter may include transmitting the measured self-aligning torque parameter to a server configured to analyze the measured self-aligning torque parameter, and receiving the wheel alignment condition indicating whether the measured self-aligning torque parameter and the predicted self-aligning torque parameter are within the predetermined value based from the server.

According to an aspect of an exemplary embodiment, an apparatus that detects a wheel alignment condition is provided. The apparatus includes at least one memory including computer executable instructions and at least one processor configured to read and execute the computer executable instructions. The computer executable instructions cause the at least one processor to predict a self-aligning torque parameter based on a regression model determined from a dataset including one or more from among a steering wheel angle parameter, a speed parameter, a torsion bar torque parameter, a lateral acceleration parameter, and a power steering torque parameter, compare a measured self-aligning torque parameter and the predicted self-aligning torque parameter, and output a wheel alignment condition indicating whether the wheel alignment is proper if the self-aligning torque parameter and the predicted self-aligning torque parameter are within a predetermined value based on the comparing.

The computer executable instructions may cause the at least one processor to normalize one or more parameters from among the steering wheel angle parameter, the speed parameter, the lateral acceleration parameter, the torsion bar torque parameter, the power steering torque parameter, the predicted self-aligning torque parameter and the measured self-aligning torque parameter.

The computer executable instructions cause the at least one processor to normalize according to one from among scaling, standardization, and unit length normalization.

The regression model may be a multivariate nonlinear regression model. The regression model may be a neural network including one or more from among a plurality of input neurons in an input layer, the plurality of input neurons corresponding to one or more from among a steering wheel angle parameter, a torsion bar torque parameter, a speed parameter, a lateral acceleration parameter, and a power steering torque parameter, a plurality of neurons in hidden layers, at least one output neuron in an output layer, the one output neuron corresponding to a predicted self-aligning torque parameter, an activation function including a rectified linear unit function, and a mean squared error function to model loss.

The predetermined value may correspond to a correctly calibrated wheel alignment.

The computer executable instructions may cause the at least one processor to output the wheel alignment condition by outputting a value corresponding to at least one from among a negative camber condition of wheels, a positive camber condition of wheels, a toe-in condition of wheels, a toe-out condition of wheels, a cross-toe condition of wheels and a total-toe condition of wheels.

The computer executable instructions may cause the at least one processor to determine the steering wheel angle parameter from a transducer, determine the speed parameter from a wheel speed tachometer, determine the lateral acceleration parameter from an inertial measurement unit, calculate the self-aligning torque parameter from a torsion bar torque parameter and the power steering torque parameter, and calculate the power steering torque parameter from electronic power steering current measurements.

The computer executable instructions may cause the at least one processor to output the wheel alignment condition by displaying the value on vehicle display, a mobile device, or on a backend computer.

The computer executable instructions may cause the at least one processor to compare the measured self-aligning torque parameter and the predicted self-aligning torque parameter by transmitting the measured self-aligning torque parameter to a server configured to analyze the measured self-aligning torque parameter, and receiving the wheel alignment condition indicating whether the measured self-aligning torque parameter and the predicted self-aligning torque parameter are within the predetermined value based from the server.

Other objects, advantages and novel features of the exemplary embodiments will become more apparent from the following detailed description of exemplary embodiments and the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

An apparatus and method that detect a wheel alignment condition will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

As a vehicle is driven, the alignment of wheels on a vehicle may began to shift from the calibrated or proper position to an improper position. The improper position may be a position where wheel camber or is outside of a predetermined range corresponding to a properly calibrated camber. For example, negative camber is a condition where an angle between a plane corresponding to a face of the wheel and a plane perpendicular to the flat ground beneath the vehicle is such that the bottom of the wheel is further out from the center of the vehicle than the top of the wheel when viewed from the front of the vehicle. Positive camber is a condition where an angle between a plane corresponding to a face of the wheel and a plane perpendicular to the flat ground beneath the vehicle is such that the top of the wheel is further out from the center of the vehicle than the bottom of the wheel when viewed from the front of the vehicle.

In another example, a toe-in condition is a condition where an angle between a plane corresponding to a face of the wheel and a line parallel to the ground beneath the vehicle is such that the back part of the wheel is further out from the center of the vehicle than the front of the wheel when viewed from the top of the vehicle. A toe-out condition is a condition where an angle between a plane corresponding to a face of the wheel and a line parallel to the ground beneath the vehicle is such that the back part of the wheel is closer to the center of the vehicle than the front of the wheel when viewed from the top of the vehicle. According to yet another example, a cross-toe condition is determined when a left wheel toe angle minus the right wheel toe angle differs from a calibrated value by a predetermined value and a total toe condition occurs when a left wheel toe angle plus the right wheel toe angle differs from a calibrated value by a predetermined value. Toe may be a distance measurement from a predetermined point at the front of the tire or as an angular deflection.

Usually, the aforementioned wheel alignment conditions may be diagnosed by measuring the distances between points of references and the wheels of the vehicles or by comparing measured angles to reference angles. Moreover, wheel alignment conditions may affect vehicle parameters such as a steering wheel angle parameter, a speed parameter, a lateral acceleration parameter, a self-aligning torque parameter and a power steering torque parameter. Thus, a model to diagnose or detect a wheel alignment condition from the aforementioned vehicle parameters or other vehicle parameters may be created.

Figure 1:
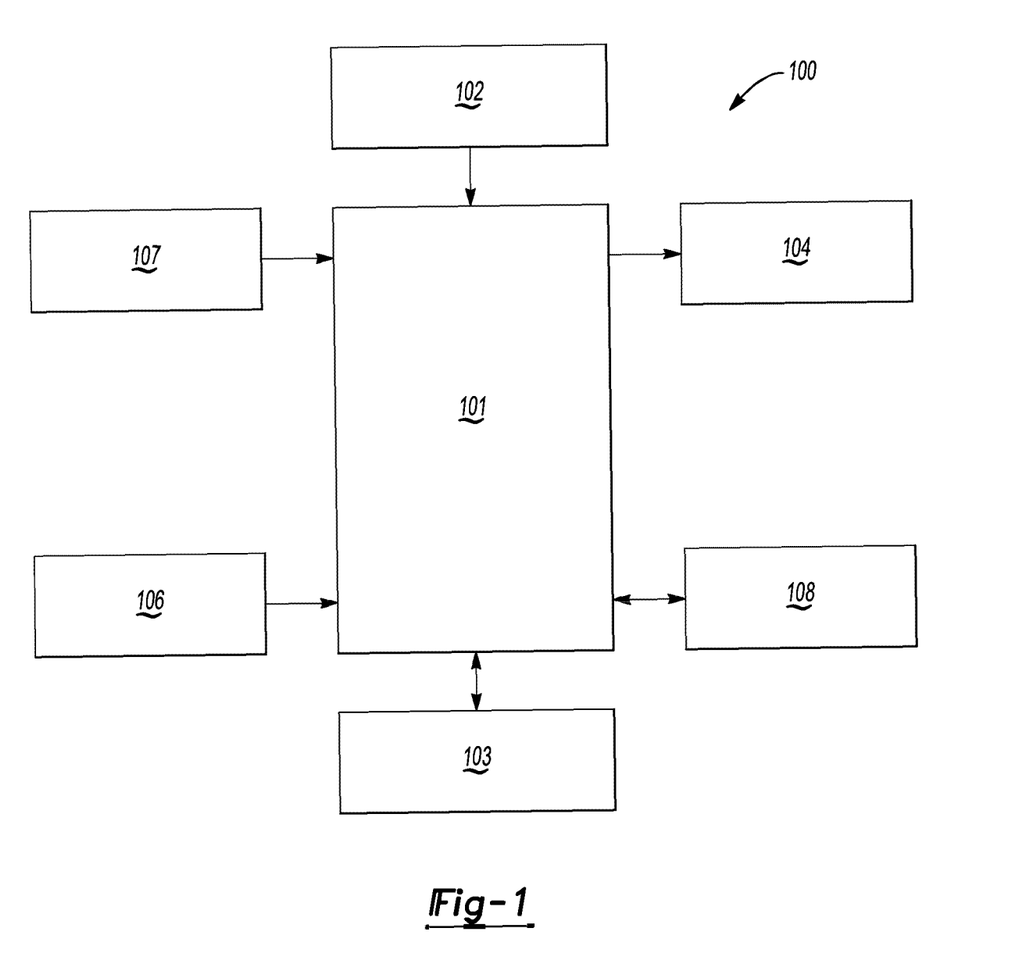
FIG. 1 shows a block diagram of an apparatus that detects a wheel alignment condition according to an exemplary embodiment.

FIG. 1 shows a block diagram of an apparatus that detects a wheel alignment condition 100 according to an exemplary embodiment. As shown in FIG. 1, the apparatus that detects a wheel alignment condition 100, according to an exemplary embodiment, includes a controller 101, a power supply 102, a storage 103, an output 104, a user input 106, a vehicle parameter sensor 107, and a communication device 108. However, the apparatus that detects a wheel alignment condition 100 is not limited to the aforementioned configuration and may be configured to include additional elements and/or omit one or more of the aforementioned elements. The apparatus that detects a wheel alignment condition 100 may be implemented as part of a vehicle, as a standalone component, as a hybrid between an on vehicle and off vehicle device, or in another computing device.

The controller 101 controls the overall operation and function of the apparatus that detects a wheel alignment condition 100. The controller 101 may control one or more of a storage 103, an output 104, a user input 106, a vehicle parameter sensor 107, and a communication device 108 of the apparatus that detects a wheel alignment condition 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the vehicle parameter sensor 107, and the communication device 108 of the apparatus that detects a wheel alignment condition 100. The information may be sent and received via a bus or network, or may be directly read or written to/from one or more of the storage 103, the output 104, the user input 106, the vehicle parameter sensor 107, and the communication device 108 of the apparatus that detects a wheel alignment condition 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the vehicle parameter sensor 107, and the communication device 108, of the apparatus that detects a wheel alignment condition 100. The power supply 102 may include one or more from among a battery, an outlet, a capacitor, a solar energy cell, a generator, a wind energy device, an alternator, etc.

The storage 103 is configured for storing information and retrieving information used by the apparatus that detects a wheel alignment condition 100. The storage 103 may be controlled by the controller 101 to store and retrieve information received from the vehicle parameter sensor 107 and the communication device 108. The information may include one or more from among vehicle parameter information, wheel alignment condition, and/or values indication whether the wheel alignment is within a predetermined value based on the model. Wheel alignment condition information may include one or more from among a negative camber condition of wheels, a positive camber condition of wheels, a toe-in condition of wheels, and a toe-out condition of wheels. Vehicle parameter information may include one or more from among a steering wheel angle parameter, a speed parameter, a lateral acceleration parameter, a self-aligning torque parameter and a power steering torque parameter. The storage 103 may also include the computer instructions configured to be executed by a processor to perform the functions of the apparatus that detects a wheel alignment condition 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that detects a wheel alignment condition 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information on a value indicating whether the wheel alignment condition is within a predetermined value based on the model, a negative camber condition of wheels, a positive camber condition of wheels, a toe-in condition of wheels, and/or a toe-out condition of wheels. The notification may also include information on a steering wheel angle parameter, a speed parameter, a lateral acceleration parameter, a self-aligning torque parameter and/or a power steering torque parameter.

The user input 106 is configured to provide information and commands to the apparatus that detects a wheel alignment condition 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate or deactivate the apparatus that detects a wheel alignment condition 100. For example, the setting to turn the system on or off may be selected by an operator via user input 106.

The vehicle parameter sensor 107 may include one or more from among a plurality of sensors configured to measure or detect vehicle parameters including one or more form among a steering wheel angle parameter, a speed parameter, a lateral acceleration parameter, a self-aligning torque parameter and a power steering torque parameter. For example, the steering wheel angle parameter is measured by a transducer, the speed parameter is measured by a wheel speed tachometer, the lateral acceleration parameter is measured by an inertial measurement unit, the self-aligning torque parameter is calculated from a torsion bar torque parameter and the power steering torque parameter, and the power steering torque parameter is calculated from electronic power steering current measurements.

The communication device 108 may be used by apparatus that detects a wheel alignment condition 100 to communicate with several types of external apparatuses according to various communication methods. The communication device 108 may be used to send/receive vehicle parameter information, wheel alignment condition, and/or values indication whether the wheel alignment is within a predetermined value based on the model.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that that detects a wheel alignment condition 100 may be configured to predict a self-aligning torque parameter based on a regression model determined from a dataset including one or more from among a steering wheel angle parameter, a speed parameter, a lateral acceleration parameter, and a power steering torque parameter, compare a measured self-aligning torque parameter and the predicted self-aligning torque parameter, and output a wheel alignment condition indicating whether the wheel alignment is proper if the self-aligning torque parameter and the predicted self-aligning torque parameter are within a predetermined value based on the comparing. The regression model may be a multivariate nonlinear regression model.

The controller 101 of the apparatus that detects a wheel alignment condition 100 may be configured to normalize one or more parameters from among the steering wheel angle parameter, the speed parameter, the lateral acceleration parameter, the power steering torque parameter, the predicted self-aligning torque parameter and the measured self-aligning torque parameter. The controller 101 may normalize according to one from among scaling, standardization, and unit length normalization.

The controller 101 of the apparatus that that detects a wheel alignment condition 100 may be configured to output the wheel alignment condition by outputting a value corresponding to at least one from among a negative camber condition of wheels, a positive camber condition of wheels, a toe-in condition of wheels, a toe-out condition of wheels, a cross-toe condition of wheels and a total-toe condition of wheels.

The controller 101 may determine the steering wheel angle parameter from a transducer, determine the speed parameter from a wheel speed tachometer, determine the lateral acceleration parameter from an inertial measurement unit, calculate the self-aligning torque parameter from a torsion bar torque parameter and the power steering torque parameter, and calculate the power steering torque parameter from electronic power steering current measurements.

The controller 101 of the apparatus that detects a wheel alignment condition 100 may be configured to output the wheel alignment condition by displaying the value on vehicle display, a mobile device, or on a backend computer.

The controller 101 of the apparatus that detects a wheel alignment condition 100 may be configured to comparing the measured self-aligning torque parameter and the predicted self-aligning torque parameter by transmitting the measured self-aligning torque parameter to a server configured to analyze the measured self-aligning torque parameter and receiving the wheel alignment condition indicating whether the measured self-aligning torque parameter and the predicted self-aligning torque parameter are within the predetermined value based from the server.

Figure 2:
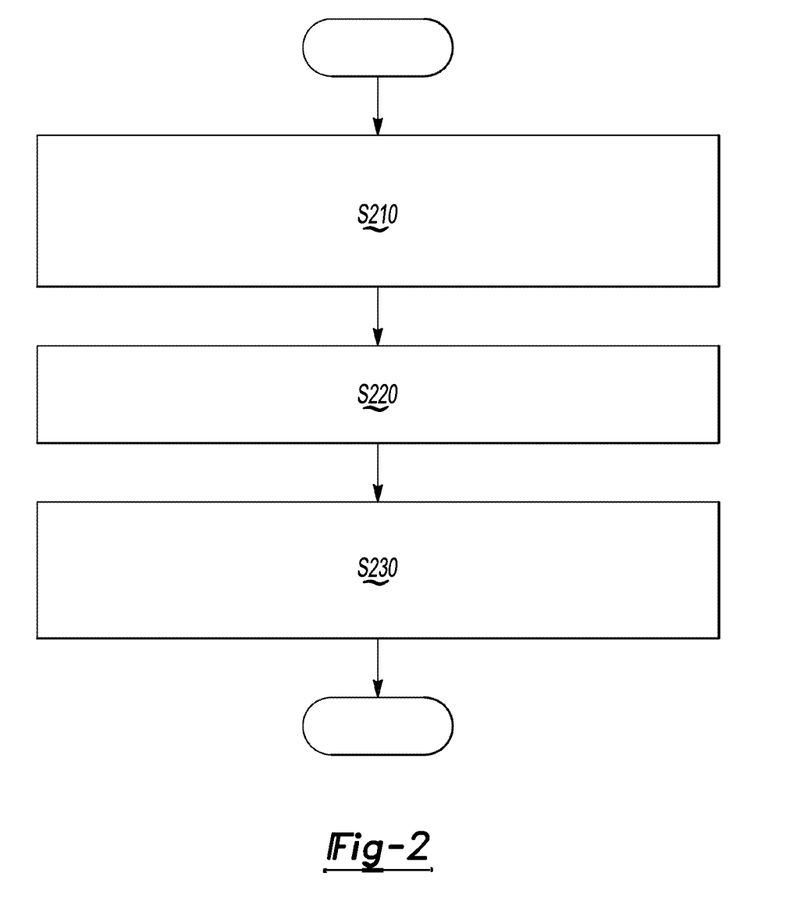
FIG. 2 shows a flowchart for a method for detecting a wheel alignment condition according to an exemplary embodiment.

FIG. 2 shows a flowchart for a method for detecting a wheel alignment condition according to an exemplary embodiment. The method of FIG. 2 may be performed by the apparatus detects a wheel alignment condition 100 or may be encoded into a computer readable medium as instructions that are executable by a computer to perform the method.

Referring to FIG. 2, a self-aligning torque parameter is predicted based on a regression model determined from a dataset in operation S210. The dataset may include one or more vehicle parameters from among a steering wheel angle parameter, a speed parameter, a lateral acceleration parameter, and a power steering torque parameter. The regression model may be a multivariate nonlinear regression model.

In operation S220, a measured self-aligning torque parameter is compared to the predicted self-aligning torque parameter. Then, in operation S230, a wheel alignment condition indicating whether the wheel alignment is proper is output if the self-aligning torque parameter and the predicted self-aligning torque parameter are within a predetermined value based on the comparing. The predetermined value may correspond to a correctly calibrated wheel alignment and the outputting the wheel alignment condition may output a value corresponding to at least one from among a negative camber condition of wheels, a positive camber condition of wheels, a cross-camber condition of wheels, a toe-in condition of wheels, a toe-out condition of wheels, a cross-toe condition of wheels, a total-toe condition of wheels and a cross caster condition of wheels.

The dataset may include normalized vehicle parameters and measured vehicle parameters may also be normalized. The normalizing of the one or more parameters may be performed according to one from among scaling, standardization, and unit length normalization. Scaling a parameter may be performed according to the following equation:

$$x' = \frac{x - \min(x)}{\max(x) - \min(x)},$$

where x is the parameter and x' is the normalized parameter.

Standardization may be performed according the following equation:

$$x' = \frac{x - \bar{x}}{\sigma},$$

where x is the parameter, $\bar{x}$ is the mean value of x, $\sigma$ is the standard deviation of x, and x' is the normalized parameter.

Unit length normalization may be performed according to the following equation:

$$x' = \frac{x}{\|x\|},$$

where x is the parameter and x' is the normalized parameter.

Figure 3:
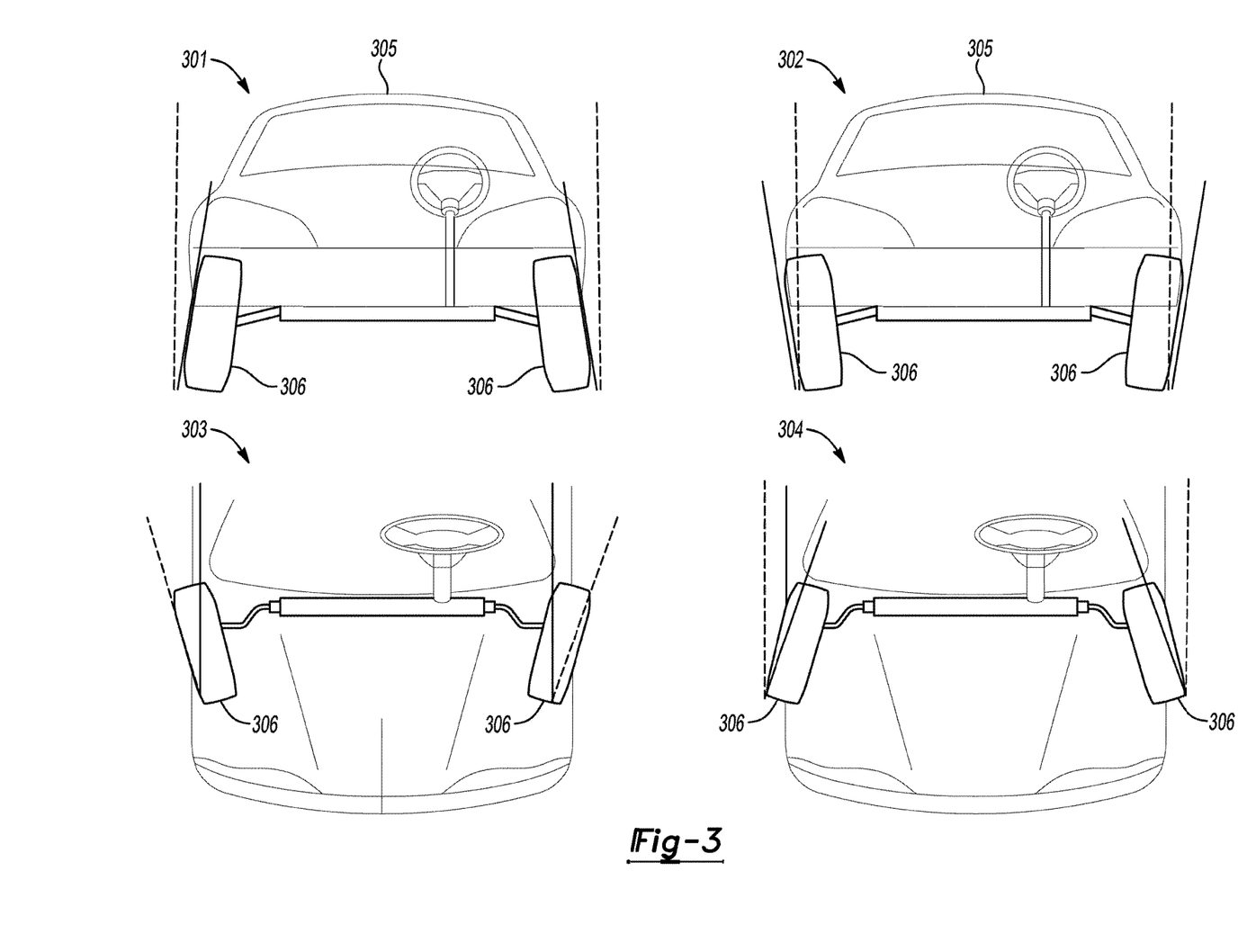
FIG. 3 shows illustrations of improper wheel alignment conditions according to an aspect of an exemplary embodiment.

FIG. 3 shows illustrations of improper wheel alignment conditions according to an aspect of an exemplary embodiment. Referring to FIG. 3, a negative camber condition or a condition where the top of one or more wheels point toward the vehicle when viewed from the front of a vehicle is shown in illustration 301. A positive camber condition or a condition where the top of one or more wheels point away from the vehicle when viewed from the front of a vehicle is shown in illustration 302. A toe-in condition or a condition where one or more wheels point inward when viewed from the top of the vehicle is shown in illustration 303. A toe-out condition or a condition where one or more wheels point outward when viewed from the top of the vehicle is shown in illustration 304.

Figure 4A:
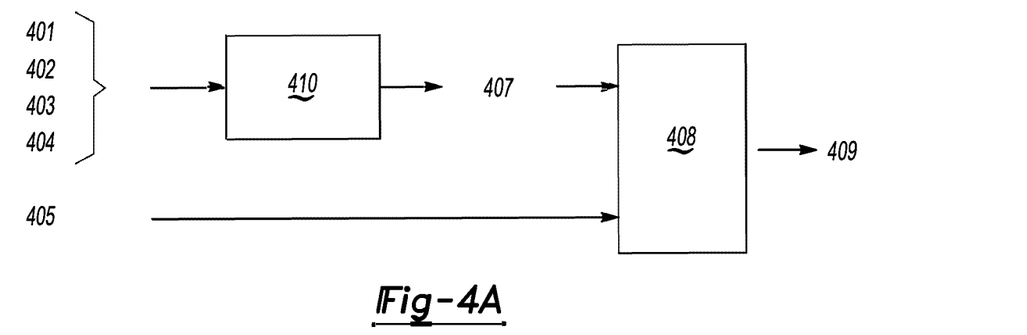
FIGS. 4A-4C show a flow diagrams for detecting a wheel alignment condition according to an aspect of an exemplary embodiment.
Figure 4B:
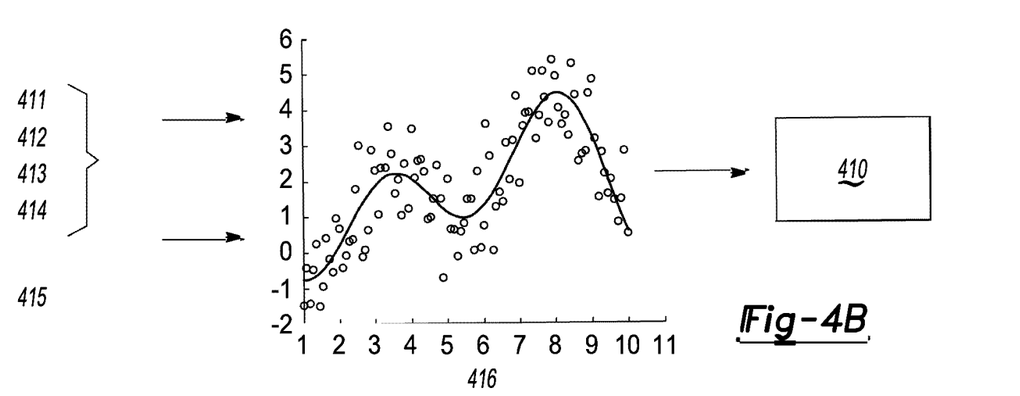
Figure 4C:
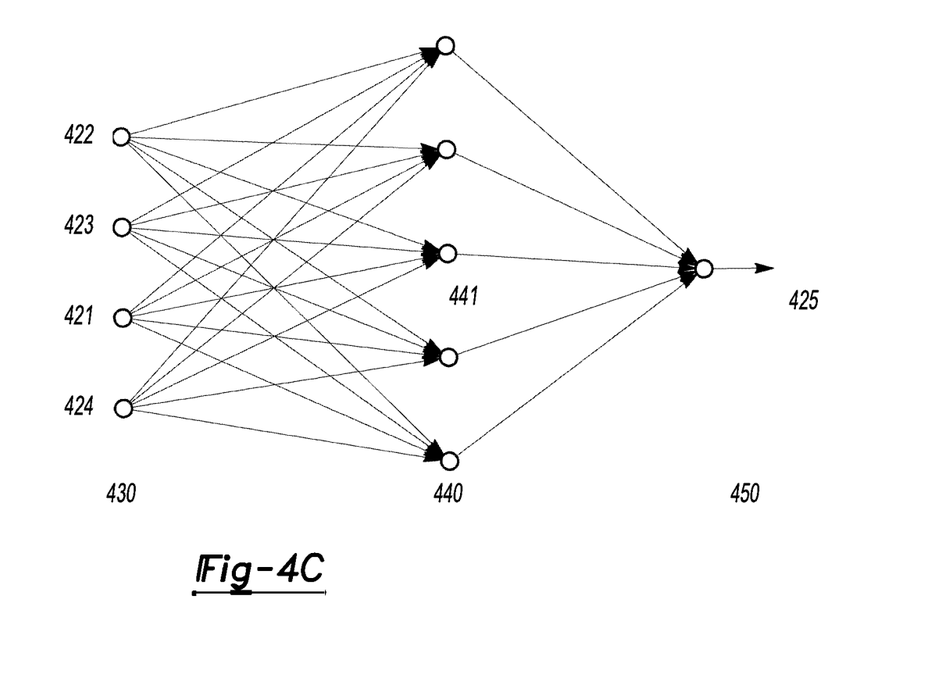

FIGS. 4A-4C show flow diagrams for detecting a wheel alignment condition according to an aspect of an exemplary embodiment. Referring to FIG. 4A, a plurality of datasets including measured parameters including one or more from among a steering wheel angle parameter 401, a speed parameter 402, a lateral acceleration parameter 403, and a power steering torque parameter 404 are plugged into a regression model 410 to predict a self-aligning torque parameter 407. The plurality of datasets may include normalized parameters. The predicted self-aligning torque parameter 407 is compared to a measured self-aligning torque parameter 405 in block 408 and the comparison is used to determine the wheel alignment condition 409.

Referring to FIG. 4B, examples of measured parameters including one or more from among a steering wheel angle parameter 411, a speed parameter 412, a lateral acceleration parameter 413, a power steering torque parameter 414 and a self-aligning torque parameter 415 and a torsion bar torque parameter (not shown) are measured to learn a regression model 410 which predicts the self-aligning toque 415 using a machine learning algorithm 416

Referring to FIG. 4C, a regression model in the form of a neural network is shown. The neural network includes four input neurons 421-424 in an input layer 430. The four input neurons correspond measured values of a steering wheel angle parameter 421, a speed parameter 422, a lateral acceleration parameter 423, and a power steering torque parameter 424. In addition, a plurality of neurons 441 make up the hidden layer 440. The output layer 450 includes one output neuron corresponding to a predicted self-aligning torque parameter 425. The activation function may be one or more from among a rectified linear unit function, a logistic, sigmoid or soft step function, a Tanh function, an ArcTan function, a softsign function, and a parametric rectified linear unit function.

T mean squared error function may be used to model loss during training. An example of a mean square loss function is:

$$L = \frac{1}{n}\sum_{i=0}^{n}(y^i - \hat{y}^i)^2,$$

where y is the ground truth and $\hat{y}$ is the prediction.

Figure 5:
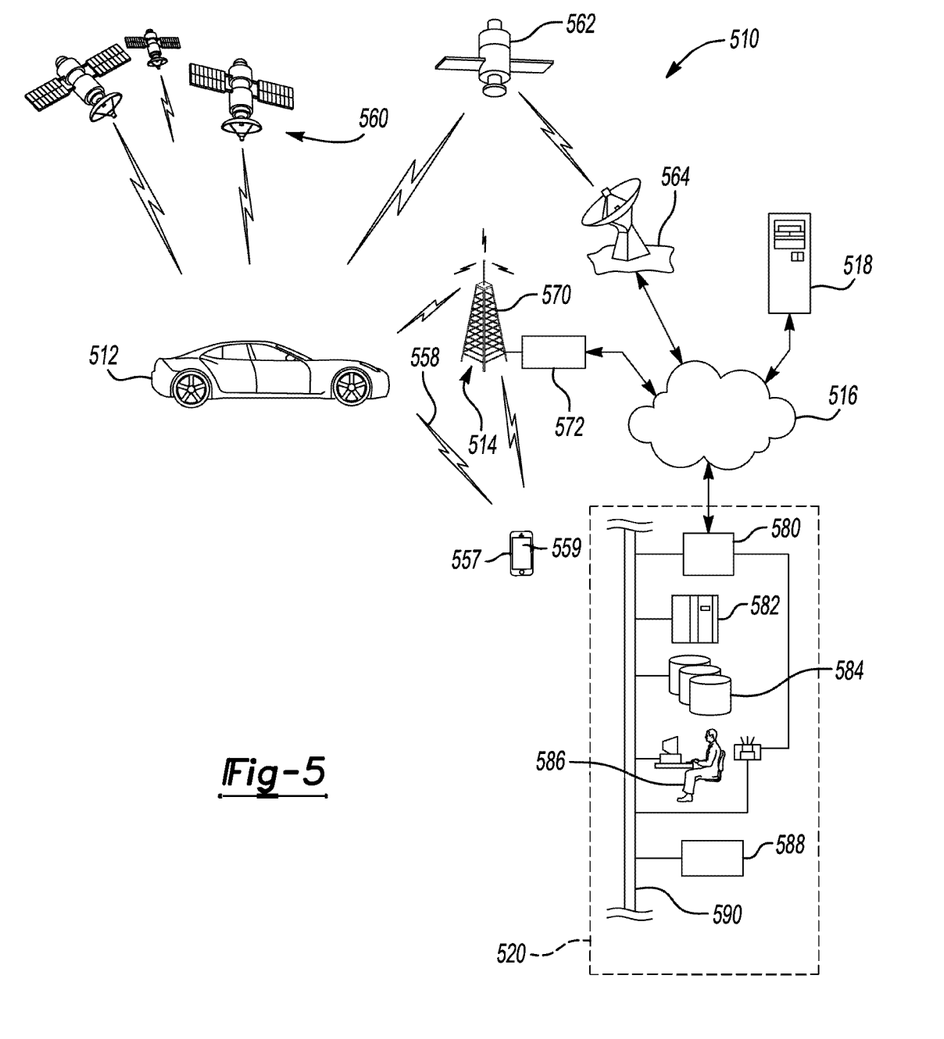
FIG. 5 shows a diagram of a system for reporting a wheel alignment condition according to an aspect of an exemplary embodiment.

FIG. 5 shows a diagram of a system for reporting a wheel alignment condition according to an aspect of an exemplary embodiment. In particular, FIG. 5 shows an illustration of an operating environment that comprises a mobile vehicle communications system 510 and that can be used to implement the apparatus and the method that detect a wheel alignment condition disclosed herein.

Referring to FIG. 5, an operating environment that comprises a mobile vehicle communications system 510 and that can be used to implement apparatus and the method for detecting the wheel alignment condition is shown. Communications system 510 may include one or more from among a vehicle 512, one or more wireless carrier systems 514, a land communications network 516, a computer 518, and a call center 520. It should be understood that the disclosed apparatus and the method for detecting wheel alignment condition can be used with any number of different systems and is not specifically limited to the operating environment shown here. The following paragraphs simply provide a brief overview of one such communications system 510; however, other systems not shown here could employ the disclosed apparatus and the method that detect a wheel alignment condition as well.

Vehicle 512 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. One or more elements of apparatus for detecting a hazardous vehicle 100 shown in FIG. 1 may be incorporated into vehicle 512.

One of the networked devices that can communicate with the communication device 108 is a wireless device, such as a smart phone 557. The smart phone 557 can include computer processing capability, a transceiver capable of communicating using a short-range wireless protocol 558, and a visual smart phone display 559. In some implementations, the smart phone display 559 also includes a touch-screen graphical user interface and/or a GPS module capable of receiving GPS satellite signals and generating GPS coordinates based on those signals. One or more elements of apparatus for detecting a hazardous vehicle 100 shown in FIG. 1 may be incorporated into smart phone 557.

The GPS module of the communication device 108 may receive radio signals from a constellation 560 of GPS satellites, recognize a location of a vehicle based on the on-board map details or by a point of interest or a landmark. From these signals the communication device 108 can determine vehicle position that is used for providing navigation and other position-related services to the vehicle driver. Navigation information can be presented by the output 104 (or other display within the vehicle) or can be presented verbally such as is done when supplying turn-by-turn navigation. The navigation services can be provided using a dedicated in-vehicle navigation module, or some or all navigation services can be done via the communication device 108. Position information may be sent to a remote location for purposes of providing the vehicle with navigation maps, map annotations (points of interest, restaurants, etc.), route calculations, and the like. The position information can be supplied to call center 520 or other remote computer system, such as computer 518, for other purposes, such as fleet management. Moreover, new or updated map data can be downloaded by the communication device from the call center 520.

The vehicle 512 may include vehicle system modules (VSMs) in the form of electronic hardware components that are located throughout the vehicle and typically receive input from one or more sensors and use the sensed input to perform diagnostic, monitoring, control, reporting and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, another VSM can be the vehicle parameter sensor that detects a steering wheel angle parameter, a speed parameter, a lateral acceleration parameter, a self-aligning torque parameter and/or a power steering torque parameter, and another VSM can be a body control module that governs various electrical components located throughout the vehicle, like the vehicle's power door locks and headlights. According to an exemplary embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 512, as numerous others are also available.

Wireless carrier system 514 may be a cellular telephone system that includes a plurality of cell towers 570(only one shown), one or more mobile switching centers (MSCs) 572, as well as any other networking components required to connect wireless carrier system 514 with land network 516. Each cell tower 570 includes sending and receiving antennas and a base station, with the base stations from different cell towers being connected to the MSC 572 either directly or via intermediary equipment such as a base station controller. Cellular system 514 can implement any suitable communications technology, including for example, analog technologies such as AMPS, or the newer digital technologies such as CDMA (e.g., CDMA2000 or 1×EV-DO) or GSM/GPRS (e.g., 4G LTE). As will be appreciated by those skilled in the art, various cell tower/base station/MSC arrangements are possible and could be used with wireless system 514. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 514, a different wireless carrier system in the form of satellite communication can be used to provide uni-directional or bi-directional communication with the vehicle. This can be done using one or more communication satellites 562 and an uplink transmitting station 564. Uni-directional communication can be, for example, satellite radio services, wherein programming content (news, music, etc.) is received by transmitting station 564, packaged for upload, and then sent to the satellite 562, which broadcasts the programming to subscribers. Bi-directional communication can be, for example, satellite telephony services using satellite 562 to relay telephone communications between the vehicle 512 and station 564. If used, this satellite telephony can be utilized either in addition to or in lieu of wireless carrier system 514.

Land network 516 may be a land-based telecommunications network that is connected to one or more landline telephones and connects wireless carrier system 514 to call center 520. For example, land network 516 may include a public switched telephone network (PSTN) such as that used to provide hardwired telephony, packet-switched data communications, and the Internet infrastructure. One or more segments of land network 516 could be implemented using a standard wired network, a fiber or other optical network, a cable network, power lines, other wireless networks such as wireless local area networks (WLANs), or networks providing broadband wireless access (BWA), or any combination thereof. Furthermore, call center 520 need not be connected via land network 516, but could include wireless telephony equipment so that it can communicate directly with a wireless network, such as wireless carrier system 514.

Computer 518 can be one of many computers accessible via a private or public network such as the Internet. Each such computer 518 can be used for one or more purposes, such as a web server accessible by the vehicle via the communication device 108 and wireless carrier 514. Other such accessible computers 518 can be, for example: a service center computer where diagnostic information, vehicle parameters and other vehicle data can be uploaded from the vehicle via the communication device 108; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 512 or call center 520, or both. A computer 518 can also be used for providing Internet connectivity such as DNS services or as a network address server that uses DHCP or other suitable protocol to assign an IP address to the vehicle 512.

Call center 520 is designed to provide the vehicle electronics with many different system back-end functions and, according to the exemplary embodiment shown here, generally includes one or more switches 580, servers 582, databases 584, live advisors 586, as well as an automated voice response system (VRS) 588. These various call center components may be coupled to one another via a wired or wireless local area network 590. Switch 580, which can be a private branch exchange (PBX) switch, routes incoming signals so that voice transmissions are usually sent to either the live adviser 586 by regular phone or to the automated voice response system 588 using VoIP. The live advisor phone can also use VoIP as indicated by the broken line in FIG. 5. VoIP and other data communication through the switch 580 is implemented via a modem (not shown) connected between the switch 580 and network 590. Data transmissions are passed via the modem to server 582 and/or database 584. Database 584 can store account information such as subscriber authentication information, vehicle identifiers, vehicle parameters, wheel alignment conditions, models for determining wheel alignment conditions, profile records, behavioral patterns, and other pertinent subscriber information. The server 582 may analyze the normalized dataset or parameter and control to transmit the value indicating whether the wheel alignment condition is within the predetermined value. Data transmissions may also be conducted by wireless systems, such as 802.11x, GPRS, and the like. Although the illustrated embodiment has been described as it would be used in conjunction with a manned call center 520 using live advisor 586, it will be appreciated that the call center can instead utilize VRS 588 to provide information on wheel alignment condition.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method of detecting a wheel alignment condition, the method comprising:
   predicting a self-aligning torque parameter based on a regression model determined from a dataset including a torsion bar torque parameter, a steering wheel angle parameter, a speed parameter, a lateral acceleration parameter, and a power steering torque parameter;
   comparing a measured self-aligning torque parameter and the predicted self-aligning torque parameter; and
   based on the comparing, outputting a wheel alignment condition indicating whether the wheel alignment is proper if the self-aligning torque parameter and the predicted self-aligning torque parameter are within a predetermined value;
   wherein the steering wheel angle parameter is measured by a transducer, the speed parameter is measured by a wheel speed tachometer, the lateral acceleration parameter is measured by an inertial measurement unit, the self-aligning torque parameter is calculated from the torsion bar torque parameter and the power steering torque parameter, and the power steering torque parameter is calculated from electronic power steering current measurements.

2. The method of claim 1, further comprising normalizing one or more parameters from among the steering wheel angle parameter, the speed parameter, the torsion bar torque parameter, the lateral acceleration parameter, the power steering torque parameter, the predicted self-aligning torque parameter and the measured self-aligning torque parameter.

3. The method of claim 2, wherein the normalizing comprises normalizing the one or more parameters according to one from among scaling, standardization, and unit length normalization.

4. The method of claim 1, wherein the regression model is a multivariate nonlinear regression model.

5. The method of claim 1, wherein the regression model is a neural network comprising one or more from among:
   a plurality of input neurons in an input layer, the plurality of input neurons corresponding to one or more from among a steering wheel angle parameter, a torsion bar torque parameter, a speed parameter, a lateral acceleration parameter, and a power steering torque parameter;
   a plurality of neurons in hidden layers;
   at least one output neuron in an output layer, the one output neuron corresponding to a predicted self-aligning torque parameter;
   an activation function including a rectified linear unit function; and
   a mean squared error function to model loss.

6. The method of claim 1, wherein the predetermined value corresponds to a correctly calibrated wheel alignment.

7. The method of claim 1, wherein the outputting the wheel alignment condition outputs a value corresponding to at least one from among a negative camber condition of wheels, a positive camber condition of wheels, a toe-in condition of wheels, a toe-out condition of wheels, a cross-toe condition of wheels and a total-toe condition of wheels.

8. The method of claim 1, wherein the outputting the wheel alignment condition comprises displaying the value on vehicle display, a mobile device, or on a backend computer.

9. The method of claim 1, wherein the comparing the measured self-aligning torque parameter and the predicted self-aligning torque parameter comprises:
   transmitting the measured self-aligning torque parameter to a server configured to analyze the measured self-aligning torque parameter; and
   receiving the wheel alignment condition indicating whether the measured self-aligning torque parameter and the predicted self-aligning torque parameter are within the predetermined value based from the server.

10. An apparatus that detects a wheel alignment condition, the apparatus comprising:
    at least one memory comprising computer executable instructions; and
    at least one processor configured to read and execute the computer executable instructions, the computer executable instructions causing the at least one processor to:
    predict a self-aligning torque parameter based on a regression model determined from a dataset including a steering wheel angle parameter, a speed parameter, a torsion bar torque parameter, a lateral acceleration parameter, and a power steering torque parameter;
    compare a measured self-aligning torque parameter and the predicted self-aligning torque parameter; and
    output a wheel alignment condition indicating whether the wheel alignment is proper if the self-aligning torque parameter and the predicted self-aligning torque parameter are within a predetermined value based on the comparing;
    wherein the steering wheel angle parameter is measured by a transducer, the speed parameter is measured by a wheel speed tachometer, the lateral acceleration parameter is measured by an inertial measurement unit, the self-aligning torque parameter is calculated from the torsion bar torque parameter and the power steering torque parameter, and the power steering torque parameter is calculated from electronic power steering current measurements.

11. The apparatus of claim 10, wherein the computer executable instructions cause the at least one processor to normalize one or more parameters from among the steering wheel angle parameter, the speed parameter, the lateral acceleration parameter, the torsion bar torque parameter, the power steering torque parameter, the predicted self-aligning torque parameter and the measured self-aligning torque parameter.

12. The apparatus of claim 11, wherein the computer executable instructions cause the at least one processor to normalize according to one from among scaling, standardization, and unit length normalization.

13. The apparatus of claim 10, wherein the regression model is a multivariate nonlinear regression model.

14. The apparatus of claim 10, wherein the regression model is a neural network comprising one or more from among:
- a plurality of input neurons in an input layer, the plurality of input neurons corresponding to one or more from among a steering wheel angle parameter, a torsion bar torque parameter, a speed parameter, a lateral acceleration parameter, and a power steering torque parameter;
- a plurality of neurons in hidden layers;
- at least one output neuron in an output layer, the one output neuron corresponding to a predicted self-aligning torque parameter;
- an activation function including a rectified linear unit function; and
- a mean squared error function to model loss.

15. The apparatus of claim 10, wherein the predetermined value corresponds to a correctly calibrated wheel alignment.

16. The apparatus of claim 10, wherein the computer executable instructions cause the at least one processor to output the wheel alignment condition by outputting a value corresponding to at least one from among a negative camber condition of wheels, a positive camber condition of wheels, a toe-in condition of wheels, a toe-out condition of wheels, a cross-toe condition of wheels and a total-toe condition of wheels.

17. The apparatus of claim 10, wherein the computer executable instructions cause the at least one processor to output the wheel alignment condition by displaying the value on vehicle display, a mobile device, or on a backend computer.

18. The apparatus of claim 10, wherein the computer executable instructions cause the at least one processor to compare the measured self-aligning torque parameter and the predicted self-aligning torque parameter by:
- transmitting the measured self-aligning torque parameter to a server configured to analyze the measured self-aligning torque parameter; and
- receiving the wheel alignment condition indicating whether the measured self-aligning torque parameter and the predicted self-aligning torque parameter are within the predetermined value based from the server.

* * * * *